United States Patent [19]

Anderson, III et al.

[11] Patent Number: 4,479,389
[45] Date of Patent: Oct. 30, 1984

[54] TUNED VIBRATION DETECTOR

[75] Inventors: Philip M. Anderson, III, Chatham; Ronald K. Reich, Phillipsburg, both of N.J.; Donald Raskin, New York, N.Y.

[73] Assignee: Allied Corporation, Morris Township, Morris County, N.J.

[21] Appl. No.: 422,325

[22] Filed: Sep. 23, 1982

Related U.S. Application Data

[63] Continuation-in-part of Ser. No. 349,739, Feb. 18, 1982.

[51] Int. Cl.³ ............................................. G01H 1/00
[52] U.S. Cl. ...................................... 73/651; 73/654; 73/593
[58] Field of Search ................. 73/651, 593, 654, 658, 73/660; 310/26

[56] References Cited

U.S. PATENT DOCUMENTS

| | | | |
|---|---|---|---|
| 4,041,775 | 8/1977 | McNamee | 73/651 |
| 4,254,354 | 3/1981 | Keem | 73/35 X |
| 4,341,189 | 7/1982 | Yamaguchi et al. | 73/651 |
| 4,357,825 | 11/1982 | Yamaguchi et al. | 73/651 |

OTHER PUBLICATIONS

"Force and Displacement Transducers . . . " by Mohri et al. from Electrical Engineering in Japan, vol. 99, No. 2, pp. 105–112, Jan.–Feb., 1979.

*Primary Examiner*—James J. Gill
*Attorney, Agent, or Firm*—Ernest D. Buff; Paul Yee; Gerhard H. Fuchs

[57] ABSTRACT

This invention provides a vibration sensor for detecting vibrations having preselected frequencies. The sensor has a plurality of tuning mechanisms each being mechanically resonant with a different preselected vibrational frequency. The resonating vibrational movements of these tuning mechanisms apply varying stresses to a plurality of glassy magnetostrictive elements associated therewith. Each of the magnetostrictive elements is responsive to a different one of the tuning mechanisms. A magnetic biasing element imparts a magnetization to the magnetostrictive elements and a detecting mechanism associated with the magnetostrictive elements detects changes in the magnetization thereof caused by the varying stresses applied thereto.

22 Claims, 9 Drawing Figures

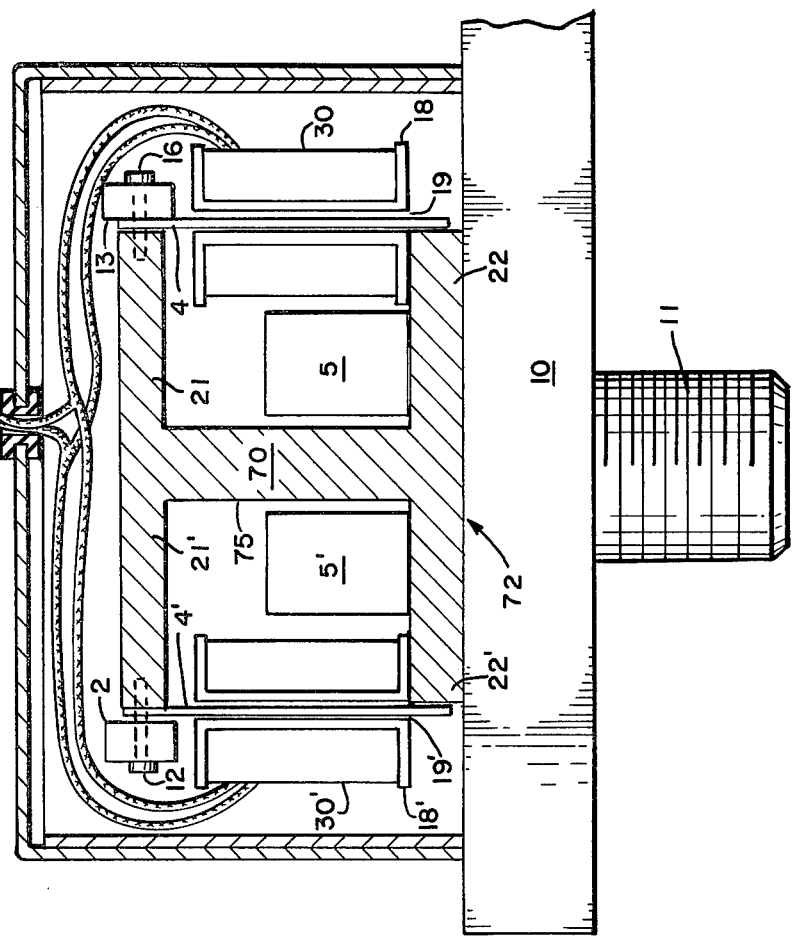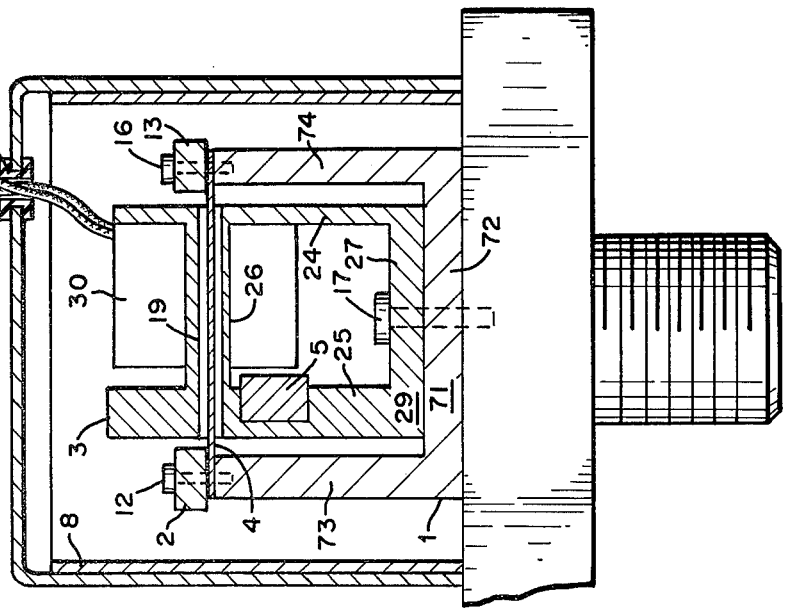

TUNED VIBRATION DETECTOR

CROSS-REFERENCE TO RELATED APPLICATIONS

This is a continuation-in-part of our copending U.S. patent application Ser. No. 349,739 filed Feb. 18, 1982.

BACKGROUND OF THE INVENTION

1. Field of the Invention

This invention relates to vibration sensors and, more particularly, to sensors for detecting failure in rotating machinery.

2. Description of the Prior Art

Bearing materials, although properly manufactured, installed and maintained are, nevertheless, subject to fatigue. Fatigue is the result of shear stresses cyclically applied immediately below the load carrying surfaces and is observed as spalling away of surface metal. In addition to fatigue, premature spalling can be caused by inadequate lubrication, material defects and mechanical damages caused by vibration or electric currents. Therefore, damaged bearings can take the form of cracks, pits, dents, or ridges on either the rollers or inner or outer races.

When a defect comes in contact with a hard surface, such as when a roller defect hits a race or a race defect is hit by a roller, an acoustic impulse is created in the bearing. FIG. 1 illustrates the frequency response of a defective bearing. FIG. 2 illustrates at a, b and c typical defect points indicated by peaks a, b and c of FIG. 1.

Early detection of peaks a, b and c allows the operator of a device containing a bearing to schedule a maintenance shutdown rather than waiting for a bearing failure. Sensing changes of acoustic noise of the shaft speed, indicated in FIG. 1 by peak d also allows early detection of rotor imbalances.

Present technology uses a broad band (flat frequency response) sensor, usually piezoelectric, to detect changes in bearing acoustic noise. An accelermeter is mounted near the bearing and a frequency spectrum is obtained. This procedure requires a recording method, such as an XY recorder or a spectrum analyzer and a skilled interpreter. Because of the expense of such recording instruments, and the large number of bearings in most industrial processes, it is necessary to rotate the instrumentation from one bearing to another, making constant monitoring impossible.

Vibration sensors using magnetostrictive transducers employ crystalline metal alloys which require special annealing procedures and which even then have low magnetomechanical coupling (MMC) factors (in the order of 0.25). Thus, more transducer material is needed to produce a given output signal. Such transducer materials are usually soft mechanically. They are easily scratched and deformed, and crystalline metal magnetostrictive transducer materials having higher MMC factors are expensive and brittle. As a result, undesirable limitations are required to handle these materials during manufacturing operations. In addition, a high magnetic bias field in the order of 300 oersteds is needed for proper operation of present devices. This requires the use of more expensive and powerful magnets to impart the higher levels of magnetization needed for these materials, and if electromagnets are used to provide this magnetic bias, those electromagnets will require more electrical power and can cause heat dissipation problems. Furthermore, crystalline metal alloys employed as magnetostrictive transducers are negative magnetostriction alloys and require substantial amounts of material to support the compressive loads to which they are subjected during operation. Mechanical structures needed to provide those compressive loads are not easily changed to make the structures mechanically resonant with the different vibrational frequencies that are characteristic of different failures. Since each failure can have a different characteristic vibrational frequency many different vibration detectors must be specifically manufactured and inventoried to ensure that a matched detector, tuned to resonate at the characteristic frequency, is available for each particular bearing type. For these reasons, vibration detectors of the type described above have complex and expensive structures and provide output signals too low in magnitude.

SUMMARY OF THE INVENTION

The present invention provides a low cost, sensitive, and versatile vibration sensor for detecting failure conditions in rotating machinery. The sensor has a plurality of tuning means, each being mechanically resonant with a different preselected vibrational frequency to be detected. The resonating vibrational movements of these tuning means apply varying stresses to a plurality of glassy metal magnetostrictive elements associated therewith. Each of the magnetostrictive elements is responsive to resonating vibrational movement of a different one of the tuning means. A magnetic biasing means imparts a magnetization to the magnetostrictive elements, and a detecting means associated with the magnetostrictive elements detects changes in the magnetization thereof caused by the varying stresses applied thereto. In a preferred embodiment, the stresses applied to the magnetostrictive elements are tensile.

The vibration sensor of this invention is especially adapted to be mounted near or directly on the bearing to sense the shaft speed frequency as well as the defect frequencies of each of the roller, the inner race and the outer race of the bearing. The sensor has a voltage output capable to powering an inexpensive voltmeter. In one embodiment of the invention, the voltmeter has a dial that is segmented to provide a good zone and a bad zone. Such embodiment permits the meter to be monitored readily by the worker to determine the condition of a bearing. In another embodiment of the invention, a horn or light may be used in view of the meter to indicate bearing condition The vibration sensor of this invention has many advantageous features. It is capable of applying tensile stresses and can be adapted for use with positive magnetostriction materials such as glassy metal alloys. Since the sensor is capable of using these glassy metal alloys, it requires less magnetostrictive material, it has higher sensitivities with output signals that can be readily processed without preamplification. The sensor is readily tunable to different preselected vibrational frequencies, with the result that it can be adapted for use with other apparatus such as motors, turbines, pumps and the like, where a failure or particular operating condition is evidenced by a characteristic vibrational frequency.

BRIEF DESCRIPTION OF THE DRAWINGS

The invention will be more fully understood and further advantages will become apparent when reference is made to the following detailed description and the accompanying drawings in which:

FIG. 8 is a longitudinal section of an alternate embodiment of the invention; and FIG. 9 is a longitudinal section of a third embodiment of the invention.

DESCRIPTION OF PREFERRED EMBODIMENTS

Figure 1:
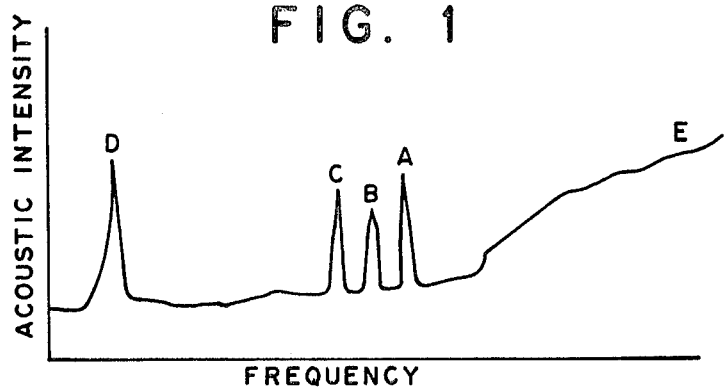
FIG. 1 is a graph showing the frequency spectrum of acoustic noise generated by the bearing illustrated in FIG. 2.
Figure 2:
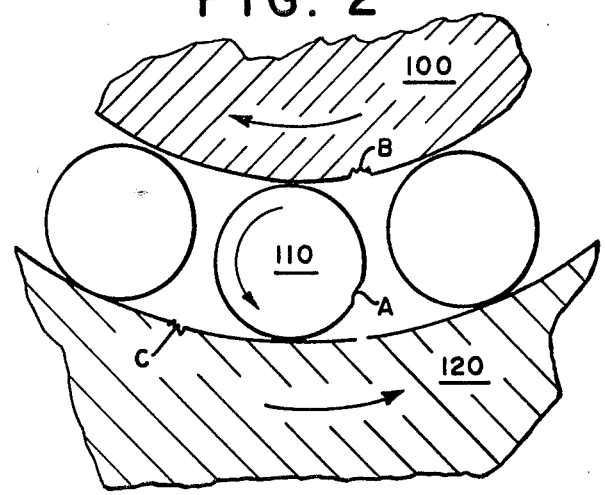
FIG. 2 is a side view of a bearing illustrating typical defect points.
Figure 7:
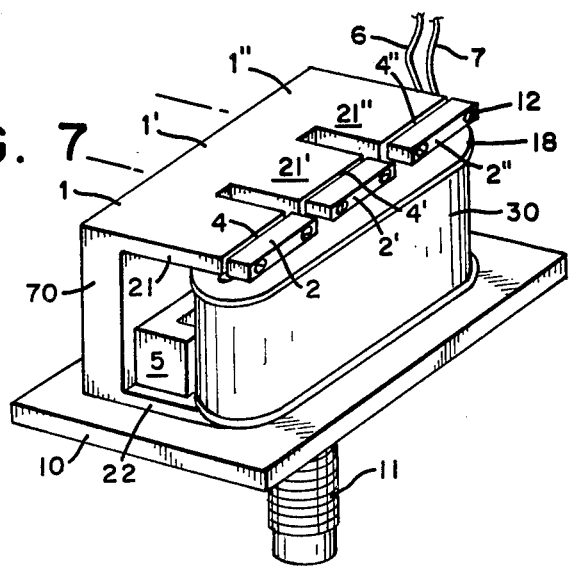
FIG. 7 is an isometric view of the vibration detector.
Figure 5:
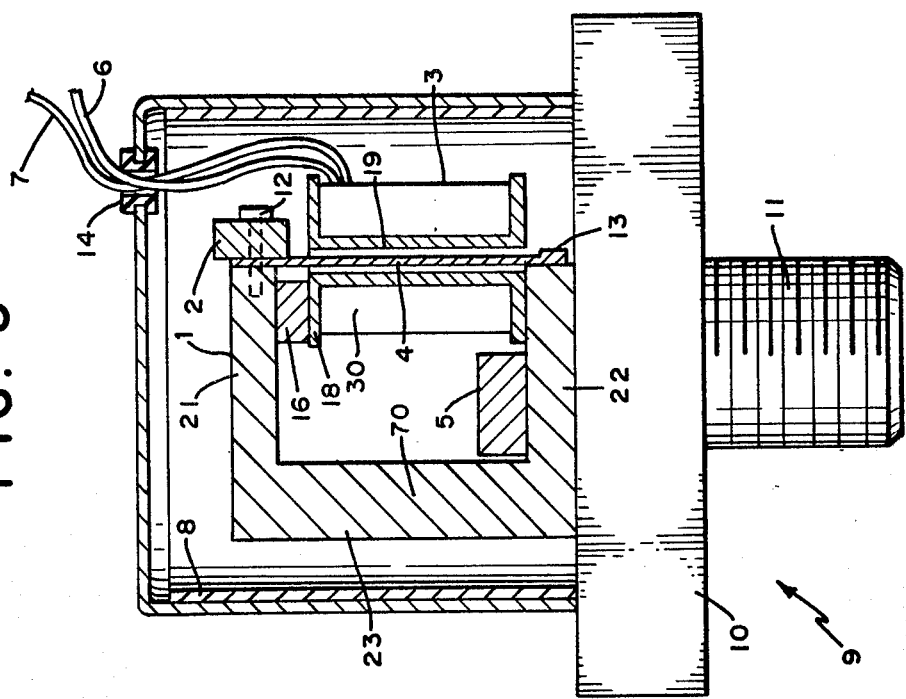
FIG. 5 is a longitudinal section taken along line A—A of FIG. 4.

The vibration sensor of this invention may be used in a variety of applications where a failure or particular operating condition is evidenced by characteristic vibrational frequencies. For example, certain failures in rotating machinery, such as motors or turbines, and certain failures in electrical apparatus, such as transformers and capacitors, have characteristic vibrational frequencies. While the particular embodiment of the invention shown and described is adapted for use with a rolling element bearing to detect vibrations characteristic of spalling or other defects, it is readily apparent that the invention is suitable for other applications as well; all of which are within the scope of this invention.

Referring to FIGS. 3-7 of the drawings, there is illustrated a preferred embodiment of a vibration detector, shown generally at 9. Detector 9 has a plurality of tuning means 1, 1', 1'', each being mechanically resonant with a different preselected frequency to be detected. A plurality of magnetostrictive elements of glassy metal, shown as ribbon 4, 4', 4'' are connected, respectively to tuning means 1, 1', 1'' by suitable fastening means to undergo varying stress applied by the resonating vibrational movements of their respective tuning means 1, 1', 1''. A magnetic biasing means, shown as magnet 5, imparts a magnetization to ribbons 4, 4', 4'' and a detecting means 3 detects changes in the magnetization of ribbons 4, 4', 4'' caused by the varying applied stresses. Detector 9 has a base 10. Base 10 includes a threaded stud 11 adapted for attachment to a suitable location on a rolling element bearing, such as the pillow, or motor or pump housing or the like, where defect induced vibrations are present.

Each of tuning means 1, 1', 1'' is comprised of mechanically resonant frame 70, clamp 2, 2', 2'' and screw 12. Frame 70 is comprised of a horizontal bottom element 22 attached to base 10 by a suitable fastening means such as welding, a vertical support element 23, and a plurality of horizontal cantilevered arm elements 21, 21', 21''. Support element 23 is disposed at one end of bottom element 22 and is oriented approximately perpendicular to bottom element 22. Cantilevered arm elements 21, 21', 21'' are positioned at the top end of support element 23 so that each of the elements 21, 21', 21'' is approximately equally spaced along and perpendicular to support element 23. Thus, frame 70 is shaped substantially the same as an angular letter "C". The materials and dimensions of frame 70 are selected to tune frame 70 to a plurality of preselected, vibrational resonant frequencies. Changing the mass of cantilevered elements 21, 21', 21'' such as by changing the mass of attachable clamps 2, 2', 2'' provides a simple means for varying the mechanical resonant frequencies of frame 70. Thus, when manufacturing a family of detectors tuned to different characteristic frequencies, only one simple part need be changed for each frequency to be detected. This allows a commonality and interchangeability of parts important to minimizing manufacturing costs. In addition, the "C" shape configuration of frame 70 permits the number of parts used in construction of detector 9 to be minimized.

Magnetostrictive ribbons 4, 4', 4'' are attached to bottom element 22 with a fastening means such as weld 13. If ribbons 4, 4', 4'' are composed of a positive magnetostriction material, approximately 1000 grams of tensile force is applied to prestress each of ribbons 4, 4', 4'' before attaching each to its respective cantilevered element 21, 21', 21'' with clamps 2, 2', 2'' and screw 12. Although a prestress is not essential for operation, it prevents undesired buckling and twisting of ribbon 4 and helps to optimize the sensitivity of the device. Preferably each ribbon 4, 4', 4'' is disposed perpendicular to its respective cantilevered element 21, 21', 21'' such that each ribbon 4, 4', 4'' lies substantially collinear with the vertical, resonating movements of the attached end of its respective cantilevered element 21, 21', 21''. This orientation most effectively uses the resonating movement of frame 70, and more particularly the resonating movements of cantilever elements 21, 21', 21'', to apply stress to ribbons 4, 4', 4''. It is possible to use other orientations for ribbons 4, 4', 4'' or even laminate ribbons 4, 4', 4'' to their respective cantilever elements 21, 21', 21''. However, such arrangements of elements degrade the performance of the sensor. If ribbons 4, 4', 4'' are composed of negative magnetostriction material, frame 70 is easily adapted to maintain a level of compressive prestress in ribbons 4, 4', 4''; the desired level of compressive stress is applied to each of ribbons 4, 4', 4'' before they are secured to their respective cantilevered elements 21, 21', 21'' by clamps 2, 2', 2'' and screw 12. However, each ribbon 4, 4', 4'' must be reinforced or be constructed of a bulk material such as a rod or laminated sheet layers in order to prevent undesired buckling.

Amorphous, glassy metals are particularly suited for constructing ribbons 4, 4', 4''. Such metal is prepared by cooling a melt of the desired composition at a rate of at least about $10^5$° C./sec, employing metal alloy quenching techniques well-known to the glassy metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys, without degradation of the MMC factor. Preferably, the glassy metal material must be at least 80% glassy to attain superior ductility. The metastable phase may also be a solid solution to the constituent elements. In the case of the element of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired finegrained size of crystallites. Such metastable materials are also ductile when produced under the conditions described above.

Magnetostrictive metallic glasses which can be used with the invention have a composition essentially of the formula $M_aN_bO_cX_dY_eZ_f$, where M is at least one of iron and cobalt, N is nickel, O is at least one of chromium and molybdenum, X is at least one of boron and phosphorous, Y is silicon, Z is carbon, "a"–"f" are in atom percent, "a" ranges from about 35–85, "b" ranges from about 0–45, "c" ranges from about 0–7, "d" ranges from about 5–22, "e" ranges from about 0–15 and "f" ranges from about 0–2, and the sum of d+e+f ranges from about 15–25.

These materials have magneto-mechanical coupling (MMC) factors of 0.4 in their as cast state. If these glassy metals are specially annealed, the MMC factors can be as high as 0.95. Consequently, such glassy metal magnetostrictive materials can efficiently convert vibrational energy into electromagnetic energy. Glassy metals are also harder and stronger than magnetostrictive materials made of crystalline metals and can withstand greater stress. Furthermore, glassy metal magnetostrictive materials can be produced which will exhibit positive magnetostriction. These glassy metals are responsive to applied tensile stress, and since they can function in the tensile mode, less material is needed; there is no need to support compressive loads which would cause the material to bend or buckle. In the embodiment shown, a thin ribbon of glassy metal 1.78 cm long, 0.5 cm wide, and 0.0038 cm thick is sufficient to produce a device which provides an output signal of over 1 volt when subjected to an input acceleration of 3.5 m/sec$^2$. More magnetostrictive material could be used to produce a device having a larger output signal or more sensitivity, if desired.

Magnet 5 is located in proximity to ribbons 4, 4', 4" to provide a magnetic bias to ribbons 4, 4', 4". Although a permanent magnet is shown in this embodiment, an electromagnet could be used or a magnetic remanence could be induced in each ribbon 4, 4', 4". In any case, the magnetic field provided by magnet 5 should be approximately 100 oersteds. Magnet 5 is horseshoe shaped and oriented to optimize performance. In this embodiment, magnet 5 is disposed such that a line connecting the ends of the horseshoe lies substantially parallel to the transverse, width dimension of ribbons 4, 4', 4".

Detecting means 3 is comprised of coil 30 and bobbin 18. Bobbin 18 is fastened on top of bottom element 22 with a suitable fastening means such as an adhesive, and has a longitudinal slot 19 extending therethrough along its central axis. Slot 19 is sized and positioned to accommodate the placement and free passage of ribbons 4, 4', 4" therethrough. A coil 30 of electrically conductive material, such as wire, is wound around bobbin 18; approximately 6,000 turns of number 40 magnet wire are used in the embodiment shown. In place of the single coil and bobbin described herein, a separate coil and bobbin may be used to provide a detecting means for each of ribbons 4, 4' 4".

Damper 16 is a piece of resilient material, such as pipe dope, attached to frame 70 in order to broaden the bandwidth of the detector and provide sensitivity over a preselected range of frequencies. The characteristic frequency of a defect induced vibration can vary from bearing to bearing because of manufacturing tolerances. With the detector responsive to a bandwidth of vibrational frequencies, the matching of individual detectors to individual bearings becomes less critical. Enclosure 90 which protects the operating elements of the sensor against the ambient environment, is a cylinder with an open end and a closed end. The open end is placed over the operating elements of the sensor enclosing them and is then attached to base 10 by a suitable means such as crimping. A wide choice of materials could be used for enclosure 90, such as metal or plastic, and a ferrous metal can be used to provide protection as well as some electromagnetic shielding against stray fields that might cause the vibration sensor device to produce extraneous output signals. In addition, another electromagnetic shield 8 made of high permeability material can be located inside of enclosure 90. Shield 8 can be constructed from a flat sheet of material which is loosely formed into a cylindrical shape and placed inside of enclosure 90. As it springs back and tries to return to its original flat shape, forms a friction fit with the inside surface of enclosure 90. Enclosure 90 has a hole 14 extending through it, and installed within hole 14 is grommet 15 to accomodate the passage of coil signal output leads 6 and 7 therethrough. It is readily apparent that other means for communicating the signal output of coil 30 through enclosure 90 to appropriate processing electronics can be used. For example, one of the leads may be grounded to base 10 or electrical terminal means such as prongs, screws or sockets may be provided; all of which are within the scope of this invention.

The described bearing defect detector operates in the following manner: When a crack or spalling occurs in a bearing of a motor, pump, compressor or the like, it produces sonic vibrations of a characteristic frequency. The precise frequency of this sound depends on various factors, including the size and the geometry of the rollers and the inner and outer bearing races, and the RPM of the motor. These sound vibrations are conducted through the bearing mount and then through base 10 to frame 70. Frame 70 of the bearing defect detector is tuned to mechanically resonate at the frequencies selected to match the characteristic vibrational frequencies caused by defects in the roller, or in the inner or outer bearing race. As frame 70 resonates, one or more of cantilever elements 21, 21', 21" develop a resonating movement similar to that observed in a tuning fork after it is struck. Ribbons 4, 4', 4" are attached between frame bottom element 22 and cantilevered arms 21, 21', 21" respectively and the resonating movements of any of the arms 21, 21', 21" apply a varying stress to any of the corresponding ribbons 4, 4', 4", respectively. Since each ribbon 4, 4', 4" is a magnetostrictive material, the varying applied stress causes the magnetic permeability of the affected ribbon 4, 4', 4" to vary. Each ribbon 4, 4', 4" is biased with an initial level of magnetization by magnet 5, and as the permeability of each ribbon 4, 4', 4" changes, corresponding changes in this level of magnetization also occur. Since coil 30 is in close proximity to and effectively wound around ribbons 4, 4', 4", the changing magnetization within any of ribbons 4, 4', 4" induces a varying voltage in coil 30 in accordance with Faraday's Law. This induced voltage is routed to appropriate processing electronics through output wires 6 and 7.

Figure 3:
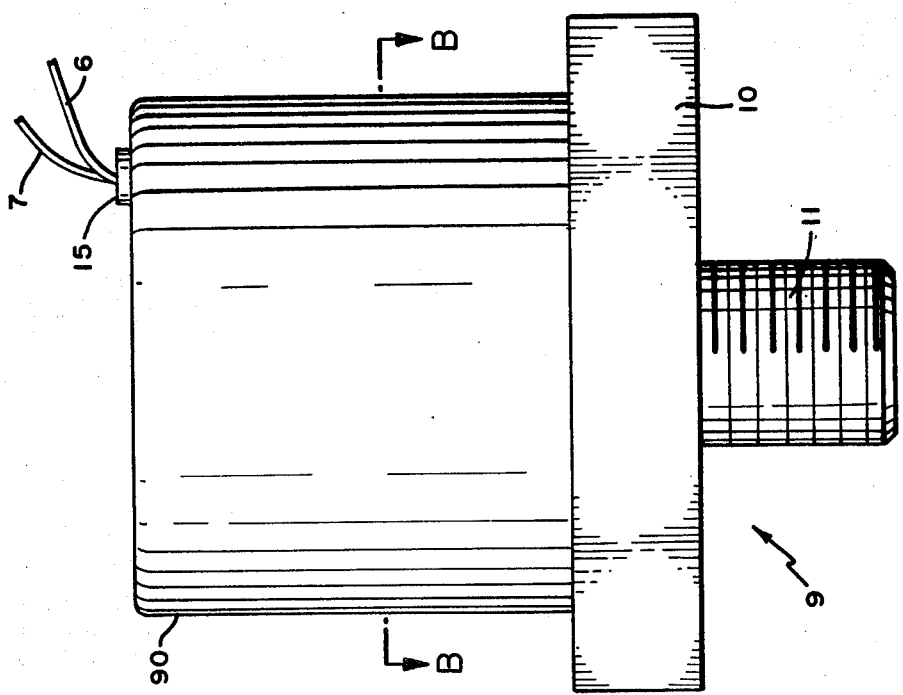
FIG. 3 is a side plan view of the vibration sensor.
Figure 4:
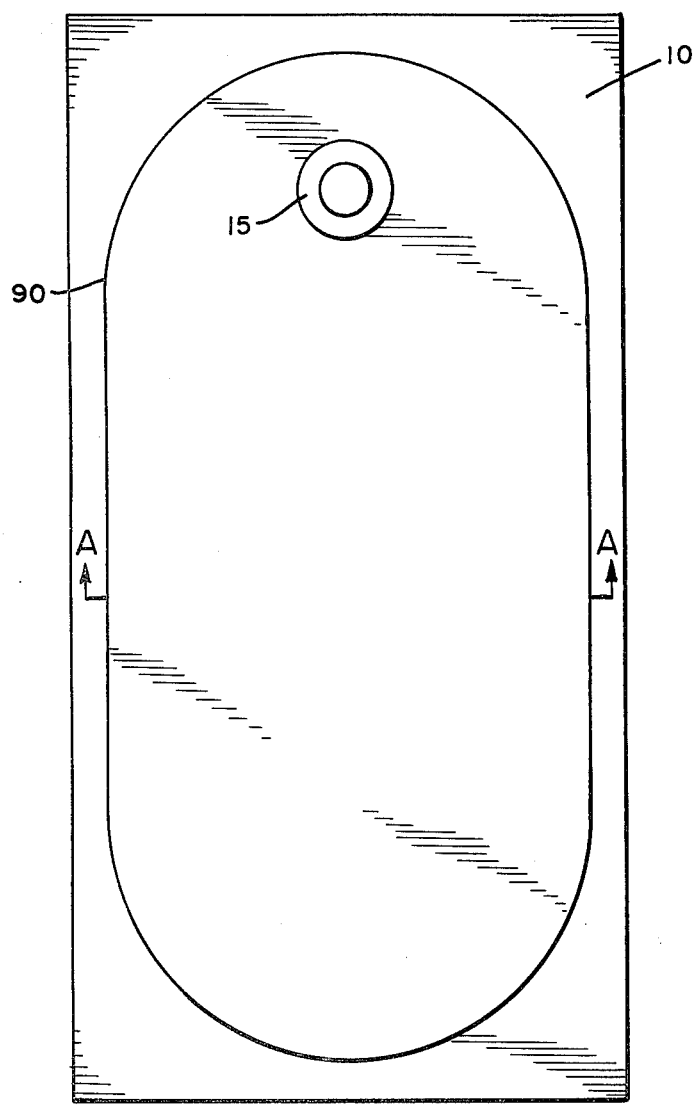
FIG. 4 is a top plan view of the vibration sensor.
Figure 6:
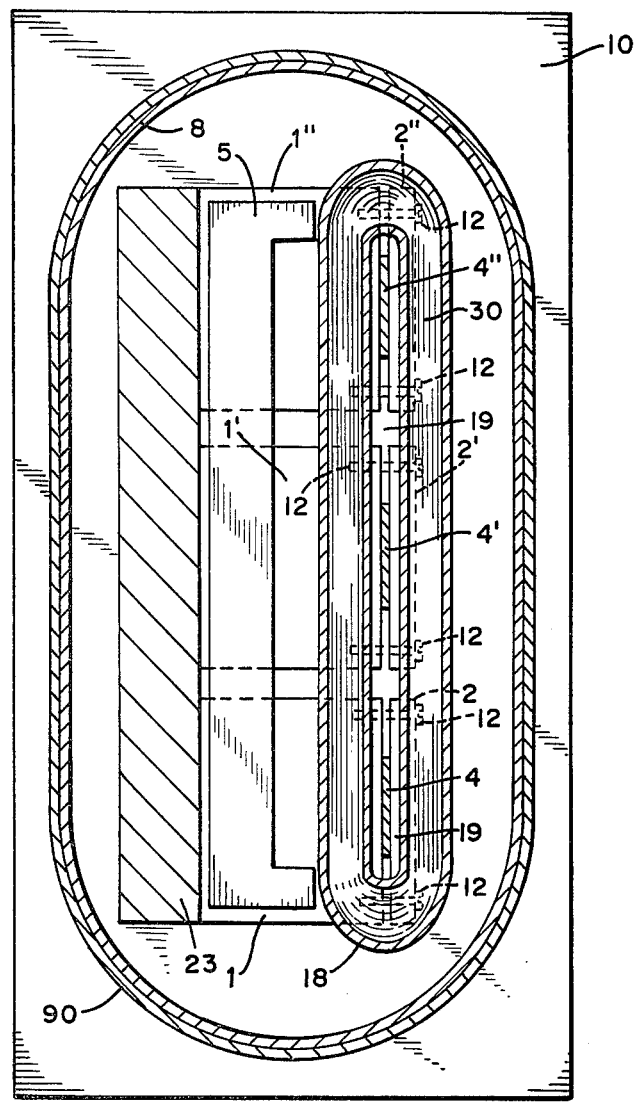
FIG. 6 is a lateral section taken along line B—B of FIG. 3.

Referring to FIGS. 3, 4 and 8 of the drawings, there is illustrated a second embodiment of this invention. Frame 71 has a horizontal base portion 72, assembled to base 10 with assembly screw 17, and a plurality of pairs of vertical cantilevered elements, the first pair being shown at 73 and 74. Cantilevered element pair 73 and 74 is located at opposite ends of base portion 72 and positioned approximately perpendicular to the base portion 72. Preferably each of the cantilevered element of pair 73 and 74 is approximately of equal length. When viewing resonant frame 71, it has a shape substantially the same angular letter "U". Additional cantilevered element pairs (not shown) are then disposed adjacent element pair 73 and 74 to form therebehind a plurality of "U"'s. Each of the additional cantilevered elements has substantially the same construction as cantilevered element pair 73 and 74, the construction of the cantilevered element pairs being such that each pair is individually provided with a separate ribbon 4, clamps 2, 13 and screws 12, 16, but has in common base 10 and horizontal base portion 72, as well as coil support 29, coil 30 and magnet 5, described hereinafter in more detail. The materials and dimensions of frame 71 are chosen so that each pair of cantilevered elements 73 and 74 mechanically resonates at a preselected frequency. Since bearing defects typically produce characteristic frequencies of less than 1 kilohertz, frame 71 is made of plastic or a metal such as brass. With this embodiment of the bearing defect detector, it is possible to obtain a bandwidth of vibrational frequencies by tuning each cantilevered element of a pair to a slightly different resonant frequency. The tuning of each individual cantilevered element 73 or 74 can be accomplished by changing the weight of clamp 2 or 13, respectively. Ribbon 4, of magnetostrictive material is attached between cantilevered elements 73 and 74. First, one end of ribbon 4 is attached to one cantilevered element 73 with clamp 2 and screw 12. If ribbon 4 is composed of a positive magnetostriction material, a small tensile prestress of approximately 1000 grams force is applied to the second end of ribbon 4 before attaching it to cantilevered element 74 with clamp 13 and screw 16. This tensile stress prevents unwanted buckling and twisting of ribbon 4 during operation and helps to optimize the sensitivity of the sensor. If ribbon 4 is composed of a negative magnetostriction material, one can apply a compressive prestress to ribbon 4 before clamping it to cantilevered element 74. However, if compressive stress is applied to ribbon 4, some additional reinforcement is necessary to prevent the ribbon from buckling or bending. Coil support 29 supports and positions pick up coil 30 and has a base portion 27 assembled to frame 71 and base 10 with screw 17. In addition, coil support 29 has two vertical upstanding support legs 24 and 25 of approximately equal length disposed at opposite ends of the base portion 27 and has a top bobbin portion 26 spanning the distance between the upper ends of support legs 24 and 25. A longitudinal slot 19 located through bobbin portion 26 is appropriately sized and positioned to accomodate the placement and free passage of ribbon therethrough. Coil 30 is wound around bobbin portion 26 with approximately 6,000 turns of number 40 magnet wire and has output leads 6 and 7. Enclosure 90, which is disposed around the operative sensor elements to protect them from the ambient environment, can be made of metal or plastic material. A ferrous metal can be used to provide some electromagnetic shielding. Additional electromagnetic shielding can be provided by a magnetic shield 8 made of an appropriate ferromagnetic material having high permeability.

This embodiment of the invention operates similarly to the previous embodiment except that the pairs of cantilevered elements, 73 and 74, can individually produce resonating movements to apply stresses to their respective ribbons 4. Specific advantages of this embodiment are that it can be simultaneously tuned to two slightly different resonant frequencies, thereby broadening the output bandwidth of each pair of cantilevered elements, 73, 74.

Referring to FIGS. 3, 4 and 9 of the drawings, there is illustrated a third embodiment of this invention. Frame 70 has a horizontal base portion 72, attached to base 10 by suitable fastening means such as welding, brazing, adhesive bonding or the like, and a set of horizontal cantilevered elements, 21 and 21'. Each of the cantilevered elements 21, 21' of the set is located at one end of the vertical portion 75 of frame 70 so as to be positioned opposite of and substantially perpendicular to the base portion 72. Preferably cantilevered elements 21 and 21' are approximately of equal length. When viewing resonant frame 70, it has a shape substantially the same as an angular letter "T". The materials and dimensions of frame 70 are chosen so that each cantilevered element of a set resonates mechanically at a different preselected frequency. Since bearing defects typically produces characteristic frequencies of less than 1 Kilohertz, frame 70 is made of plastic or metal such as brass, aluminum or the like.

Additional cantilevered element sets (not shown) are then disposed adjacent element set 21, 21' to form therebehind a plurality of "T"'s. Each of the additional cantilevered element sets has substantially the same construction as cantilevered element set 21, 21', the construction of the cantilevered element sets being such that each set is individually provided with a separate set of ribbons 4, 4', clamps 2, 13 and screws 12, 16, but has in common base 10 and horizontal base portion 72, as well as vertical portion 75, magnets 5, 5' and coils 30, 30', described hereinafter in more detail. The tuning of individual cantilevered element 21 and 21' can be accomplished by changing the weight of clamp 2 and 13, respectively. A set of ribbons 4, 4' of magnetostrictive material is attached between cantilevered elements 21 and 21', respectively. First, one end of ribbon 4 is attached to one cantilevered element 21 with clamp 2 and screw 12. If ribbon 4 is a positive magnetostriction material, a small tensile prestress of approximately 1000 grams force is applied to the second end of ribbon 4 before attaching it to horizontal base portion 22 by suitable fastening means such as welding, adhesive bonding, or mechanical fasteners such as clamps, screws or the like. This tensile stress prevents unwanted buckling and twisting of ribbon 4 during operation and helps to optimize the sensitivity of the sensor. If ribbon 4 is a negative magnetostriction material, one can apply a compressive prestress to ribbon 4 before attaching it to horizontal base portion 22. However, if compressive stress is applied to ribbon 4, some additional reinforcement is necessary to prevent the ribbon from buckling or bending. In similar fashion, ribbon 4' is connected between cantilevered element 21' and horizontal base portion 22'. Pickup coils 30, 30' have longitudinal slots 19, 19' located through bobbins 18, 18' is appropriately sized and positioned to accommodate the placement and free passage therethrough of ribbon 4 and all ribbons of the additional cantilevered element sets that connect to base portion 22, while slot 19' is similarly sized and positioned to accommodate placement and free passage therethrough of ribbon 4' as well as all ribbons of the additional cantilevered element sets that connect to base portion 22'. Coils 30, 30' are wound around bobbins 18, 18' with approximately 6,000 turns of number 40 magnet wire and are connected in parallel with common output leads 6 and 7. Enclosure 90, which is disposed around the operative sensor elements to protect them from the ambient environment, can be made of metal or plastic material. A ferrous metal can be used to provide some electromagnetic shielding. Additional electromagnetic shielding can be provided by a magnetic shield 8 made of an appropriate ferromagnetic material having high permeability.

This embodiment of the invention operates similarly to the previous embodiment except that the "T" shaped configuration of the cantilevered element sets is better suited for combining the sets together to form a compact sensor having substantially uniform dimensions.

Having thus described the invention in rather full detail, it will be understood that such details need not be strictly adhered to but that various changes and modifications may suggest themselves to one skilled in the art, all falling within the scope of the invention as defined by the subjoining claims.

We claim:

1. A vibration sensor for detecting vibrations having preselected frequencies, comprising:
    a. a plurality of tuning means each being mechanically resonant with a different preselected vibrational frequency to be detected, and each comprising a frame having a least one mechanical resonant frequency and having at least one cantilevered element extending therefrom;
    b. a plurality of positive magnetostriction glassy metal elements, each connected to a different one of said cantilevered elements to undergo a varying tensile stress in response to vibrational movements of said cantilevered elements, and each connected to said different one of said cantilevered elements with a tensile prestress applied to the glass metal element;
    c. magnetic biasing means for imparting magnetization to said magnetostrictive elements; and
    d. means associated with said magnetostrictive elements for detecting changes in the magnetization thereof due to the varying stresses applied thereto.

2. A vibration sensor as recited in claim 1, wherein each of said tuning means comprises a frame having at least one mechanical resonant frequency and two cantilevered elements extending therefrom.

3. A vibration sensor as recited in claim 2, wherein said frame additionally comprises bandwidth means for providing a bandwidth of frequencies with which said tuning means is mechanically resonant.

4. A vibration sensor as recited in claim 3, wherein said bandwidth means comprises at least one preselected mass attached to at least one of said cantilevered elements to tune each of said cantilevered elements to a different resonant frequency.

5. A vibration sensor as recited in claim 4, wherein said bandwidth means is adapted to provide a preselected bandwidth.

6. A vibration sensor as recited in claim 2, wherein said frame has a shape substantialy the same as an angular letter "U".

7. A vibration sensor as recited in claim 2, wherein said frame has a shape substantially the same as an angular letter "T".

8. A vibration sensor as recited in claim 1, wherein each of said magnetostrictive element is a metal alloy that is at least 50 per cent glassy.

9. A vibration sensor as recited in claim 1, wherein said sensor is adapted for use with a rolling element bearing to detect a plurality of characteristic vibrational frequencies caused by bearing defects.

10. A vibration sensor as recited in claim 1, wherein each of said tuning means further comprises means for varying the mechanical resonant frequency of said frame.

11. A vibration sensor as recited in claim 10, wherein said means for varying the mechanical resonant frequency of said frame is a preselected mass affixed to said cantilevered element of said frame.

12. A vibration sensor as recited in claim 1, wherein said glassy metal has a composition defined by the formula $M_a N_b O_c X_d Y_e Z_f$, where M is at least one of iron and cobalt, N is nickel, O is at least one of chromium and molybdenum, X is at least one of boron and phosphorous, Y is silicon, Z is carbon, "a"-"f" are in atom percent, "a" ranges from about 35-85, "b" ranges from about 0-45, "c" ranges from about 0-7, "d" ranges from about 5-22, "e" ranges from about 0-15 and "f" ranges from about 0-2, and the sum of $d+e+f$, ranges from about 15-25.

13. A vibration sensor as recited in claim 1, wherein said magnetic biasing means for imparting magnetization to each of said magnetostrictive elements is a single permanent magnet.

14. A vibration sensor as recited in claim 1, wherein said magnetic biasing means for imparting magnetization to each of said magnetostrictive elements is a single electromagnet.

15. A vibration sensor as recited in claim 1, wherein said means for detecting changes in the magnetization of each of said magnetostrictive elements is a single coil of wire disposed in proximity to said magnetostrictive element.

16. A vibration sensor as recited in claim 1, wherein said frame additionally comprises damping means for providing a bandwidth of frequencies with which said tuning means is mechanically resonant.

17. A vibration sensor as recited in claim 16, wherein said damping means comprises a piece of resilient material attached to said frame.

18. A vibration sensor as recited in claim 17, wherein said damping means is adapted to provide a preselected bandwidth.

19. A vibration sensor as recited in claim 1 wherein said frame has a shape substantially the same as an angular letter "C".

20. A vibration sensor adapted for use with a rolling element bearing to detect vibrations due to bearing
    a. a base adapted for mounting to apparatus comprising said bearing;
    b. a frame connected to said base and having a plurality of cantilevered elements extending therefrom, said frame being mechanically resonant with said vibrations at a plurality of frequencies;

c. a plurality of frequency adjusting means, each being connected to a different one of said cantilevered elements for varying the resonant frequencies of said frame;

d. a plurality of magnetostricutive elements of positive magnetostriction material, each connected to a different one of said cantilevered elements with a tensile prestress applied thereto and each connected to said cantilevered elements to undergo varying tensile stresses in response to resonating movement of said cantilevered elements;

e. a magnet associated with said magnetostrictive elements to impart a magnetization thereto; and f. a coil of electrically conductive material located in proximity to said magnetostrictive element for detecting changes in the magnetization thereof caused by variations of said tensile stresses.

21. A vibration sensor as recited in claim 20, wherin said resonant frame has two cantilevered elements extending therefrom.

22. A vibration sensor as recited in claim 21, wherein each of said magnetostrictive elements is composed of a metal alloy that is at least 50 per cent glassy.

* * * * *